United States Patent
Kamiya et al.

(10) Patent No.: US 6,579,960 B2
(45) Date of Patent: Jun. 17, 2003

(54) TETRAFLUOROETHYLENE/ETHYLENE COPOLYMER AND ITS FILM

(75) Inventors: Hiroki Kamiya, Chiba (JP); Shinji Okada, Kanagawa (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 10/072,999

(22) Filed: Feb. 12, 2002

(65) Prior Publication Data
US 2002/0107347 A1 Aug. 8, 2002

Related U.S. Application Data

(63) Continuation of application No. PCT/JP00/06287, filed on Sep. 13, 2000.

(30) Foreign Application Priority Data

Sep. 13, 1999 (JP) ............................................. 11-259547

(51) Int. Cl.$^7$ ..................... C08F 214/26; C08F 210/02; C08F 218/02
(52) U.S. Cl. ................... 526/250; 526/329; 526/329.4; 526/348.8; 526/352
(58) Field of Search .............................. 526/250, 348.8, 526/331, 352, 329, 329.4

(56) References Cited

U.S. PATENT DOCUMENTS

| | | | | |
|---|---|---|---|---|
| 3,615,970 A | * | 10/1971 | May ............................. | 156/78 |
| 5,771,630 A | * | 6/1998 | Harasawa ....................... | 47/26 |
| 6,111,013 A | * | 8/2000 | Simpson ....................... | 526/64 |

FOREIGN PATENT DOCUMENTS

| EP | 0 043 499 | 1/1982 |
|---|---|---|
| JP | 50-143890 | 11/1975 |
| JP | 64-43535 | 2/1989 |

* cited by examiner

*Primary Examiner*—Fred Zitomer
(74) *Attorney, Agent, or Firm*—Oblon, Spivak, McClelland, Maier & Neustadt, P.C.

(57) ABSTRACT

A tetrafluoroethylene/ethylene copolymer and a film excellent in flexibility, durability, light transmittance, strength and non-tackiness, and applications thereof. Such a copolymer has a ratio of the polymerized units based on tetrafluoroethylene/the polymerized units based on ethylene, of from 35/65 to 65/35 (molar ratio), contains from 1 to 10 mol % of polymerized units based on an alkyl vinyl ester (the carbon number of the alkyl group is from 5 to 17, and when branched, from 9 to 17), is crystalline and has a volumetric flow rate of from 1 to 1000 mm$^3$/sec.

11 Claims, No Drawings

TETRAFLUOROETHYLENE/ETHYLENE COPOLYMER AND ITS FILM

This application is a Continuation of International application Ser. No. PACT/JP00/06287, Filed on Sep. 13, 2000.

TECHNICAL FIELD

The present invention relates to a novel tetrafluoroethylene (hereinafter referred to also as TEE)/ethylene copolymer (hereinafter referred to also as an EFT copolymer), and a film made of such an EFT copolymer excellent in flexibility, dust-proofing property, light transmittance, high strength, non-tackiness, etc. Further, it relates to an agricultural covering material, a release film and an interlayer for laminated glass, made of such a film.

BACKGROUND ART

Heretofore, as an agricultural covering material for a tunnel house or a pipe house, a film made of e.g. an ethylene/vinyl acetate copolymer, a polyester resin or a soft vinyl chloride resin, has been used. Especially, a soft vinyl chloride resin film is superior to films of other materials with respect to an application efficiency, price, warmth retaining property, etc. And thus is used mostly as an agricultural covering material. However, the soft vinyl chloride film contains a plasticizer and thus has a difficulty such that the film surface is likely to be soiled by bleeding out of the plasticizer, and the light transmittance tends to deteriorate soon.

Further, many of the above conventional films have an ultraviolet absorber incorporated to improve the weather resistance, but due to deterioration attributable to e.g. sunlight, atmospheric temperature, wind and rains, oxidation, etc., they have to be replaced usually in one to two years. Besides, such films having an ultraviolet absorber incorporated, shield ultraviolet rays inevitably, although there may be a difference in the degree of ultraviolet absorptively. Accordingly, such films are not suitable for cultivation of crop plants which require ultraviolet rays (such as eggplants or certain types of flowers) or for cultivation of crop plants to be pollinated by e.g. bees, Mahanaabu or drone flies which require ultraviolet rays (such as strawberries, melons, water melons or green peppers).

Further, in recent years, really large sized houses have been employed for the purpose of labor saving in house control, enlargement of the cultivation area and prolongation of useful life of houses. For such large sized houses, a covering material made of e.g. a polyester resin, a polycarbonate resin, a soft vinyl chloride resin, an acrylic resin, a fiber reinforced plastic or an inorganic sheet glass, has been used for application for a long period of at least 5 years. However, such a covering material is thick and heavy and has to be applied to a house having a large sized special base material framework, whereby the application work is complex and relatively expensive. Further, a covering material made of a polyester resin, a polycarbonate resin, a hard vinyl chloride resin, an acrylic resin or the like has a drawback that cracks are likely to form by e.g. hail, and the formed cracks are likely to propagate. Further, in the covering material of such a plastic plate contains an ultraviolet absorber in many cases, and thus has the same problem as the above described film containing an ultraviolet absorber.

For the purpose of solving such problems, a film of a fluorine resin is known which is excellent in weather resistance durability and acidic rain resistance and has a long useful life of from 10 to 15 years, and which has excellent characteristics that it is hardly soiled, or a soil can readily be removed by rain water, and it is scarcely breakable. Especially, a film of an EFT copolymer further has excellent characteristics such as heat resistance, weather resistance, light transmittance and non-tackiness and thus is proposed as an agricultural covering material and is partly commercialized.

On the other hand, when a film of an agricultural covering material is stretched over e.g. a pipe house, it is applied by fixing it to the framework of the house by means of a fixing member, while taking care so that the tension of the film will not loosen. However, a conventional film of an ETFE copolymer has a large tensile modulus of elasticity and is poor in flexibility, and there has been a practical problem that the film has to be fixed by a large tensile force.

Further, also in the field of release films to be used for formation of printed boards, a film of an ETFE copolymer is used from the viewpoint of the non-tackiness and heat resistance. Also in this case, conventional ETFE copolymers have a problem that the tensile modulus of elasticity is large, and the follow-up property to a board having a complicated shape is poor.

Further, also as an interlayer for laminated glass to be used for safety glass, conventional ETFE copolymers have had drawbacks that their tensile modulus of elasticity is large, they are hardly closely adhered to glass, and they are hardly processable, and the shock absorbing property at the time of breakage of the glass has not been sufficient, although the light transmittance is high and preferable.

From such a viewpoint, it is desired to lower the elastic modulus of the ETFE copolymer, and in order to lower the elastic modulus of a resin, it is generally proposed, for example, to blend an elastomer. In such a case, it is necessary to take into consideration the compatibility to the resin of the elastomer to be blended or the thermal stability at the molding temperature. Otherwise, deterioration of the light transmittance or the mechanical property such as the strength of the blend product, or an increase of the haze is likely to be brought about. In the case of the ETFE copolymer, selection of the elastomer to be blended, is difficult, and it has been difficult to solve the problems by this method.

On the other hand, it is known to lower the elastic modulus by copolymerizing a third component to the ETFE copolymer. For example, JP-B-8-5976 proposes an agricultural covering material made of a film of an ETFE copolymer wherein the ratio of the polymerized units based on TFE/the polymerized units based on ethylene is from 45/55 to 55/45 (molar ratio), and the copolymer contains from 0.1 to 10 mol % of polymerized units based on a (perfluoroalkyl)ethylene represented by $CH_2=CHC_nF_{2n+1}$ (n is an integer of from 2 to 10) as a third component. However, this third component is poor in copolymerization reactivity, and the perfluoroalkyl group is of a rigid structure, and in order to obtain sufficiently low tensile modulus of elasticity, the content in the copolymer is required to be high, whereby the productivity was low with high costs.

It is an object of the present invention to provide a novel ETFE copolymer which solves the above problems.

Another object of the present invention is to provide a film having a small tensile modulus of elasticity and being excellent in flexibility, light transmittance, high strength, non-tackiness, etc., by using such a novel ETFE copolymer, and an excellent agricultural covering material, a release film and an interlayer for laminated glass, employing such a film.

DISCLOSURE OF THE INVENTION

The present invention provides an ETFE copolymer characterized in that the ratio of the polymerized units based on tetrafluoroethylene/the polymerized units based on ethylene, is from 35/65 to 65/35 (molar ratio), and it contains from 1 to 10 mol % of polymerized units based on an alkyl vinyl ester (provided that the carbon number of the alkyl group is from 5 to 17, and when the alkyl group contains a branched structure, the carbon number is from 9 to 17), is crystalline and has a volumetric flow rate of from 1 to 1000 mm$^3$/sec.

A film formed of the ETFE copolymer of the present invention has a tensile modulus of elasticity as low as from 1 to 70 kg/mm$^2$ and thus is flexible, and it is also excellent in dust-proofing property, light transmittance, strength and non-tackiness. Accordingly, it is useful for many applications. Especially, it is suitable as an agricultural covering material, a release film or an interlayer for laminated glass. The low tensile modulus of elasticity of the film of the present invention is believed to be attributable to the high copolymerization reactivity of the alkyl vinyl ester as a constituting component of the ETFE copolymer, and the crystallinity and internal plasticizing effects of the copolymer due to the alkyl group having a certain specific carbon number, in the alkyl vinyl ester.

BEST MODE FOR CARRYING OUT THE INVENTION

Now, the present invention will be described in detail.

In the ETFE copolymer of the present invention, it is necessary that the ratio of the polymerized units based on tetrafluoroethylene/the polymerized units based on ethylene is from 35/65 to 65/35 (molar ratio). If the ratio of the two is not within this range, e.g. if it is smaller than 35/65, the fluorine content is small, whereby the weather resistance durability tends to be inadequate. On the other hand, if it exceeds 65/35, a haze will be formed attributable to crystalline sites, whereby the transparency tends to deteriorate. In either case, the object of the present invention can not be accomplished. A preferred range of such a ratio of the two is from 40/60 to 60/40.

The carbon number of the alkyl group in the alkyl vinyl ester as a constituting component of the ETFE copolymer of the present invention, is from 5 to 17. Especially when the alkyl group contains a branched structure, the carbon number is from 9 to 17. If the alkyl group is of a straight chain structure and has a carbon number smaller than 5, or if it contains a branched structure, and the carbon number of the alkyl group is smaller than 9, an adequately low tensile modulus of elasticity can not be obtained. On the other hand, if the carbon number of the alkyl group exceeds 17, inclusive of the case having a branched structure, it tends to be difficult to control the copolymerization composition during the polymerization, and the mechanical strength of the resulting polymer tends to be low. The above alkyl group may be one having some of its hydrogen atoms substituted by halogen atoms such as chlorine atoms or fluorine atoms.

In the present invention, the alkyl vinyl ester may be of a single type or a mixture of two or more types. Preferred specific examples of the alkyl vinyl ester to be used include, for example, vinyl caproate (the carbon number of the alkyl group is 5, which will be referred to as C5, the same applies hereinafter), vinyl caprylate (C7), vinyl caprate (C9), vinyl laurate (C11), vinyl myristate (C13), vinyl palmitate (C15) and vinyl stearate (C17).

The content of the alkyl vinyl ester in the ETFE copolymer is from 1 to 10 mol %. If the content is less than 1 mol %, an adequately low tensile modulus of elasticity can not be obtained. On the other hand, if it exceeds 10 mol %, the crystallinity of the copolymer tends to lost, whereby the mechanical strength of the resulting film tends to be low, thus leading to inconvenience, although the tensile modulus of elasticity tends to be low. Particularly preferably, the content of the alkyl vinyl ester is from 2 to 7 mol %.

The ETFE copolymer of the present invention is required to have crystallinity. Here, the crystallinity means that a peak of crystal fusion is observed by differential scanning calorimetry (DSC). Particularly preferred is one whereby the heat of crystal fusion observed at a temperature raising rate of 10° C./min is at least 0.5 cal/g. Even if a peak of fusion is observed, if the heat of fusion is less than 0.5 cal/g, it is difficult to maintain the mechanical properties. Particularly preferably, the peak of fusion is from 0.8 to 3.5 cal/g. In the present invention, the crystallinity of the copolymer can be controlled, for example, by changing the content of the alkyl vinyl ester.

Further, the ETFE copolymer of the present invention has a volumetric flow rate of from 1 to 1000 mm$^3$/sec. If the volumetric flow rate is smaller than 1 mm$^3$/sec, molding of the copolymer tends to be difficult. On the other hand, if it exceeds 1000 mm$^3$/sec, the mechanical properties tend to be inadequate. The volumetric flow rate is more preferably from 1 to 600 mm$^3$/sec from the viewpoint of the physical properties of the film and the production efficiency. In the present invention, the volumetric flow rate is defined by a value (mm$^3$/sec) represented by the volume of the ETFE copolymer flowing out in a unit time from a nozzle having a diameter of 1 mm and a length of 1 mm under a load of 30 kg/cm$^2$ by means of a Kouka-type flow tester. With respect to the measuring temperature, the melting point of the copolymer varies depending upon the composition, but in the present invention, the measurement is carried out at a temperature higher by 40° C. than the melting point.

The ETFE copolymer of the present invention can be produced by a known polymerization method such as bulk polymerization, suspension polymerization, emulsion polymerization or solution polymerization. Among them, solution polymerization is preferred, since the composition of the resulting copolymer can easily be uniformly controlled. The produced ETFE copolymer is formed into a film by a known method such as an inflation method or an extrusion molding method. With respect to the thickness of the film, if it is too thin, it is likely to break, and if it is too thick, such is inconvenient in the cutting, bonding or stretching operation, and the light transmittance tends to decrease. A preferred thickness is from 10 to 300 μm, particularly preferably from 20 to 100 μm. The width of the film is usually preferably within a range of from 1000 to 2000 mm from the viewpoint of the production of the film and the handling efficiency.

At the time of forming the above ETFE copolymer into a film, a colorant such as titanium oxide, zinc white, calcium carbonate, precipitated silica, carbon black, chrome yellow, phthalocyanine blue or phthalocyanine green, may be incorporated, as the case requires.

The film of an ETFE copolymer of the present invention has excellent flexibility, but preferably has a tensile modulus of elasticity of from 1 to 70 kg/mm$^2$, particularly preferably from 3 to 60 kg/mm$^2$. Such a film can easily be fixed to the framework of a tunnel house or a pipe house.

The tensile modulus of elasticity is measured by a method in accordance with ASTM D-1708. Namely, a microdumbbell is held at a temperature of 25° C. in an atmosphere with a relative humidity of 50% for 40 hours and then subjected to a tensile test at a crosshead speed of 1.3 mm/min with a distance between grips of 22 mm, to obtain a stress-strain curve. The tensile modulus of elasticity is defined as a value obtained by dividing the inclination of a portion of such a stress-strain curve where the stress changes linearly to the change of strain to the yield point, i.e. the stress change ($kg/mm^2$), by the strain. Here, the strain is one obtained by dividing the change in elongation (mm) by the initial value (mm) and is a dimensionless number.

Further, when the film of the present invention is used for an agricultural or horticultural installation such as the above house, the inside of the house is usually at a high temperature with a high humidity, and water droplets condensed inside of the ceiling or the wall are likely to deposit, and accordingly, it is preferred to treat at least the side of the film located inside of the house, with an anti-stick agent. The anti-stick agent may, for example, be of an alcohol-soluble type or a water-dispersible type, preferably one having a hydrophilic colloidal substance incorporated to a fluoropolymer such as polyfluoro acrylate, one having a surfactant incorporated to a hydrophilic polymer, or one having a surfactant and a hydrophilic colloidal substance incorporated to a hydrophilic polymer.

As the above hydrophilic colloidal substance, colloidal silica, colloidal alumina or colloidal titania, may, for example, be used. Further, the hydrophilic polymer may, for example, be a polyvinyl alcohol or a polymer having hydrophilic functional groups such as $-SO_3H$, $-COOH$, $-NH_2$, $-CN$ or $-(OCH_2CH_2)_m-$ (m is usually an integer of from 1 to 20). Further, the surfactant may be either anionic, cationic or nonionic surfactant.

The film of the present invention has a low tensile modulus of elasticity, is flexible and has a high light transmittance, whereby it can be applied to a tunnel house or a pipe house including a really large sized house for cultivation of farm crops and thus is useful as an excellent agricultural covering material.

Further, the film of the present invention is flexible and has heat resistance and non-tackiness, and thus, it is useful as an excellent release film at the time of molding a printed board. Further, the film of the present invention is flexible and has sufficient mechanical strength and high transparency, and thus, it is useful as an excellent interlayer for laminated glass, for e.g. safety glass.

Now, the present invention will be described in further detail with reference to Examples. However, it should be understood that the present invention is by no means restricted to such Examples. In the following, Examples 1 to 3 and 7 to 10 are Working Examples of the present invention, and Examples 4 to 6 and 11 are Comparative Examples

EXAMPLE 1

Into a deaerated stainless steel autoclave having an internal capacity of 1 l and equipped with a stirrer, 892 g of 1,1,2-trichloro-1,2,2-trifluoroethane (hereinafter referred to as R-113), 70 g of TFE, 22 g of ethylene and 16.3 g of vinyl caprylate, were charged, and the temperature was raised to 67° C. Then, 8 ml of a perfluorocyclohexane solution containing 3 wt % of t-butylperoxy isobutyrate, was injected to initiate a polymerization reaction.

The reaction was continued until the pressure became from 17.3 $kg/cm^2G$ to 16.0 $kg/cm^2G$ by the reaction. Then, the reactor was cooled, and the monomers in the reactor were purged. The dispersion containing the formed copolymer was subjected to filtration, washing and drying to obtain 10.3 g of white colored copolymer A. In the copolymer A, the ratio of the polymerized units based on TFE/the polymerized units based on ethylene was 42.7/57.3 (molar ratio), and the content of the polymerized units based on vinyl caprylate in copolymer A was 6.4 mol %, by the NMR measurements. The melting point was 190° C., and the volumetric flow rate at 230° C. was 375.4 $mm^3$/sec. Copolymer A was formed at 230° C. into a film having a thickness of 60 μm. The mechanical properties of this film i.e. the tensile modulus of elasticity ($kg/mm^2$) and the tensile strength ($kg/mm^2$), and the transparency i.e. the total light transmittance (%) and the haze (%) were measured. The results are shown in Table 1.

EXAMPLE 2

Into a deaerated stainless steel autoclave having an internal capacity of 1 l and equipped with a stirrer, 883 g of R-113, 70 g of TFE, 22 g of ethylene and 21.6 g of vinyl laurate, were charged, and the temperature was raised to 67° C. Then, 8 ml of a perfluorocyclohexane solution containing 3 wt % of t-butylperoxy isobutyrate, was injected to initiate a polymerization reaction.

The reaction was continued until the pressure became from 16.3 $kg/cm^2G$ to 15.0 $kg/cm^2G$ by the reaction. Then, the reactor was cooled, and the monomers in the reactor were purged. The dispersion containing the formed copolymer was subjected to filtration, washing and drying to obtain 15.2 g of white colored copolymer B. In the copolymer B, the ratio of the polymerized units based on TFE/the polymerized units based on E was 45.3/54.7 (molar ratio), and the content of the polymerized units based on vinyl laurate in copolymer B was 8.3 mol %, by the NMR measurements. The melting point was 179° C., and the volumetric flow rate at 230° C. was 491.4 $mm^3$/sec.

Copolymer B was formed at 230° C. into a film having a thickness of 60 μm. The tensile modulus of elasticity, tensile strength, total light transmittance and haze of this film were measured in the same manner as in Example 1. The results are shown in Table 1.

EXAMPLE 3

Into a deaerated stainless steel autoclave having an internal capacity of 1 l and equipped with a stirrer, 908 g of R-113, 73 g of TFE, 21 g of ethylene and 6.9 g of vinyl laurate, were charged, and the temperature was raised to 67° C. Then, 8 ml of a perfluorocyclohexane solution containing 3 wt % of t-butylperoxy isobutyrate, was injected to initiate a polymerization reaction.

The reaction was continued until the pressure became from 16.6 $kg/cm^2G$ to 15.3 $kg/cm^2G$ by the reaction. Then, the reactor was cooled, and the monomers in the reactor were purged. The dispersion containing the formed copolymer was subjected to filtration, washing and drying to obtain 11.8 g of white colored copolymer C. In the copolymer C, the ratio of the polymerized units based on TFE/the polymerized units based on E was 41.7/58.3 (molar ratio), and the content of the polymerized units based on vinyl laurate in copolymer C was 2.5 mol %, by the NMR measurements. The melting point was 240° C., and the volumetric flow rate at 300° C. was 420.0 $mm^3$/sec.

Copolymer C was formed at 230° C. into a film having a thickness of 60 μm. The tensile modulus of elasticity, tensile strength, total light transmittance and haze of this film were measured in the same manner as in Example 1. The results are shown in Table 1.

EXAMPLE 4

Into a deaerated stainless steel autoclave having an internal capacity of 2 l and equipped with a stirrer, 1966 g of R-113, 14.2 g of methanol, 250 g of TFE, 7.8 g of ethylene and 31.8 g of (perfluorobutyl)ethylene (hereinafter referred to as PFBE), were charged, and the temperature was raised to 65° C. Then, 7 ml of a perfluorocyclohexane solution containing 50 wt % of t-butylperoxy isobutyrate, was injected to initiate a polymerization reaction.

In order to supplement the pressure decreased by the reaction, the gas mixture having a composition of TFE/ethylene of 60/40 (molar ratio), was introduced, and the reaction was continued under a pressure of 14.3 kg/cm$^2$G. PFBE was added in a ratio of 0.1 ml per g of the gas mixture, and the reaction was continued for 8 hours. After completion of the reaction, the monomers in the reactor were purged. The dispersion containing the formed copolymer was subjected to filtration, washing and drying to obtain 204 g of white colored copolymer D.

In the copolymer D, the ratio of the polymerized units based on TFE/the polymerized units based on ethylene was 61.2/38.8 (molar ratio), and the content of the polymerized units based on PFBE in copolymer D was 4.0 mol %, by the NMR measurements. The melting point was 220° C., and the volumetric flow rate at 260° C. was 85.2 mm$^3$/sec.

Copolymer D was formed at 270° C. into a film having a thickness of 60 μm. The tensile modulus of elasticity, tensile strength, total light transmittance and haze of this film were measured in the same manner as in Example 1. The results are shown in Table 1.

EXAMPLE 5

Into a deaerated stainless steel autoclave having an internal capacity of 2 l and equipped with a stirrer, 1966 g of R-113, 14.7 g of methanol, 250 g of TFE, 17.5 g of ethylene and 17.4 g of PFBE, were charged, and the temperature was raised to 65° C. Then, 14 ml of a perfluorocyclohexane solution containing 10 wt % of t-butylperoxy isobutyrate, was injected to initiate a polymerization reaction.

In order to supplement the pressure decreased by the reaction, the gas mixture having a composition of TFE/ethylene of 53/47 (molar ratio), was introduced, and the reaction was continued under a pressure of 15.0 kg/cm$^2$G. PFBE was added in a ratio of 0.1 ml per 2 g of the gas mixture, and the reaction was continued for 8 hours. After completion of the reaction, the monomers in the reactor were purged. The dispersion containing the formed copolymer was subjected to filtration, washing and drying to obtain 164 g of white colored copolymer E. In the copolymer E, the ratio of the polymerized units based on TFE/the polymerized units based on E was 53.9/46.1 (molar ratio), and the content of the polymerized units based on PFBE was 1.4 mol %, by the NMR measurements. The melting point was 260° C., and the volumetric flow rate at 300° C. was 51.6 mm$^3$/sec.

This copolymer E was formed at 320° C. into a film having a thickness of 60 μm. The tensile modulus of elasticity, tensile strength, total light transmittance and haze of this film were measured in the same manner as in Example 1. The results are shown in Table 1.

EXAMPLE 6

With respect to a film of a vinyl fluoride polymer having a thickness of 50 μm (Tedler 200SG40TR, manufactured by Du Pont), the tensile modulus of elasticity, tensile strength, total light transmittance and haze of this film were measured in the same manner as in Example 1. The results are shown in Table 1.

With respect to the films of Examples 1 to 6, the properties as agricultural covering materials were compared by the following method, and the results are summarized in Table 1.

For the evaluation of the transparency, the total light transmittance (%) and the haze (%) were measured by means of a haze meter (Model SEP-T, manufactured by Nippon Seimitsu Kogaku) and used as an index of transparency.

With respect to stretch setting efficiency, the degree of efficiency in an operation to stretch and fix the film on a framework by means of a fixing member, was compared with a soft vinyl chloride resin and evaluated by the following three ratings. ○: The operation is easy. Δ: The operation is slightly difficult. X: The operation is possible, but requires a human power because the material is hard, and the film is likely to get wrinkles.

TABLE 1

|  | Ex. 1 | Ex. 2 | Ex. 3 | Ex. 4 | Ex. 5 | Ex. 6 |
| --- | --- | --- | --- | --- | --- | --- |
| Tensile modulus of elasticity | 41 | 14.1 | 58.4 | 61 | 96 | 184 |
| Tensile strength | 2.7 | 2.1 | 2.3 | 4.5 | 4.7 | 12.7 |
| Total light transmittance | 90 | 91 | 90 | 93 | 91 | 82 |
| Haze | 3 | 4 | 6 | 11 | 16 | 23 |
| Stretch setting efficiency | ○ | ○ | ○ | Δ | X | X |

In Examples 1 to 3 (the present invention), the good results were obtained such that the tensile modulus of elasticity was low, the stretch setting efficiency was excellent, the light transmittance was high, and the haze was low. Whereas in Examples 4 to 6 (Comparative Examples), the haze was high, and particularly in Examples 5 and 6, the tensile modulus of elasticity was high, and the stretch setting efficiency was also low.

Further, in Examples 1 to 3, the light transmittance was high, and the haze was low, and thus, the transparency was excellent, which was suitable as an interlayer for laminated glass.

Further, the resin in Example 3 had a melting point of 240° C. and was excellent in heat resistance, and it was also excellent as a release film.

EXAMPLE 7

Into a deaerated stainless steel autoclave having an internal capacity of 1 l and equipped with a stirrer, 892 g of R-113, 70 g of TFE, 22 g of ethylene and 10.9 g of Veova 9 (tradename by Shell Company, a mixture of various branched alkyl vinyl esters having a carbon number of 9), were charged, and the temperature was raised to 67° C. Then, 8 ml of a perfluorocyclohexane solution containing 3 wt % of t-butylperoxy isobutyrate, was injected to initiate a polymerization reaction.

The reaction was continued until the pressure became from 17.2 kg/cm$^2$G to 16.2 kg/cm$^2$G by the reaction. Then, the reactor was cooled, and the monomers in the reactor were purged. The dispersion containing the formed copolymer was subjected to filtration, washing and drying to obtain 8.8 g of white colored copolymer F. In the copolymer F, the ratio of the polymerized units based on TFE/the polymerized units based on ethylene was 39.5/60.5 (molar ratio), and the content of the polymerized units based on Veova 9 in copolymer F, was 2.7 mol %, by the NMR measurements. The melting point was 236° C., and the volumetric flow rate at 250° C. was 254 mm$^3$/sec.

Copolymer F was formed at 250° C. into a film having a thickness of 60 µm. The tensile modulus of elasticity of this film was 57.8 kg/mm$^2$, the tensile strength was 3.41 kg/mm$^2$, the total light transmittance was 93.6%, and the haze was 4.5%.

EXAMPLE 8

Into a deaerated stainless steel autoclave having an internal capacity of 1 l and equipped with a stirrer, 892 g of R-113, 70 g of TFE, 22 g of ethylene and 16.4 g of Veova 10 (tradename by Shell Company, a mixture of various branched alkyl vinyl esters having a carbon number of 10), were charged, and the temperature was raised to 67° C. Then, 6 ml of a perfluorocyclohexane solution containing 1 wt % of t-butylperoxy isobutyrate, was injected to initiate a polymerization reaction.

In order to supplement the pressure decreased by the reaction, a gas mixture having a composition of TFE/ethylene of 55/44 (molar ratio), was introduced, and the reaction was continued under a pressure of 16.5 kg/cm$^2$G. Veova 10 was added in a ratio of 0.2 g per g of the gas mixture, and the reaction was continued for 5 hours.

Thereafter, the reactor was cooled, and the monomers in the reactor were purged. The dispersion containing the formed copolymer was subjected to filtration, washing and drying to obtain 101 g of white colored copolymer G. In the copolymer G, the ratio of the polymerized units based on TFE/the polymerized units based on ethylene was 47.0/53.0 (molar ratio), and the content of the polymerized units based on Veova 10 in copolymer G was 9.2 mol %, by the NMR measurements. The melting point was 208° C., and the volumetric flow rate at 230° C. was 119 mm$^3$/sec.

Copolymer G was formed at 230° C. into a film having a thickness of 60 µm. The tensile modulus of elasticity of this film was 50.9 kg/mm$^2$, the tensile strength was 3.42 kg/mm$^2$, the total light transmittance was 94.7%, and the haze was 0.7%.

EXAMPLE 9

Into a deaerated stainless steel autoclave having an internal capacity of 1 l and equipped with a stirrer, 866 g of R-113, 70 g of TFE, 22 g of ethylene and 30.6 g of vinyl stearate were charged, and the temperature was raised to 67° C. Then, 8 ml of a perfluorocyclohexane solution containing 3 wt % of t-butylperoxy isobutyrate, was injected to initiate a polymerization reaction.

The reaction was continued until the pressure became from 17.2 kg/cm$^2$G to 16.5 kg/cm$^2$G by the reaction. Then, the reactor was cooled, and the monomers in the reactor were purged. The dispersion containing the formed copolymer was subjected to filtration, washing and drying to obtain 9.1 g of white colored copolymer H. In the copolymer H, the ratio of the polymerized units based on TFE/the polymerized units based on E was 37.8/62.2 (molar ratio), and the content of the polymerized units based on vinyl stearate in copolymer H was 5.5 mol %, by the NMR measurements. The melting point was 185° C., and the volumetric flow rate at 230° C. was 653.3 mm$^3$/sec.

Copolymer H was formed at 230° C. into a film having a thickness of 60 µm. The tensile modulus of elasticity of this film was 16.1 kg/mm$^2$, the tensile strength was 2.16 kg/mm$^2$, the total light transmittance was 90%, and the haze was 5.1%.

EXAMPLE 10

Into a deaerated stainless steel autoclave having an internal capacity of 1 l and equipped with a stirrer, 896 g of R-113, 61 g of TFE, 19 g of ethylene and 14.1 g of vinyl caprylate were charged, and the temperature was raised to 67° C. Then, 6 ml of a perfluorocyclohexane solution containing 3 wt % of t-butylperoxy isobutyrate, was injected to initiate a polymerization reaction.

In order to supplement the pressure decreased by the reaction, a gas mixture having a composition of TFE/ethylene of 58/42 (molar ratio), was introduced, and the reaction was continued under a pressure of 14.9 kg/cm$^2$G. Vinyl caprylate was added in a ratio of 0.2 g per g of the gas mixture, and the reaction was continued for 5 hours. Then, the reactor was cooled, and the monomers in the reactor were purged. The dispersion containing the formed copolymer was subjected to filtration, washing and drying to obtain 10.3 g of white colored copolymer I.

In the copolymer I, the ratio of the polymerized units based on TFE/the polymerized units based on ethylene was 42.2/57.8 (molar ratio), and the content of the polymerized units based on vinyl caprylate in copolymer I was 5.5 mol %, by the NMR measurements. The melting point was 196° C., and the volumetric flow rate at 230° C. was 397.0 mm$^3$/sec.

Copolymer I was formed at 230° C. into a film having a thickness of 60 µm. The tensile modulus of elasticity of this film was 39.0 kg/mm$^2$, the tensile strength was 3.39 kg/mm$^2$, the total light transmittance was 92%, and the haze was 3.1%.

EXAMPLE 11

Into a deaerated stainless steel autoclave having an internal capacity of 1 l and equipped with a stirrer, 896 g of R-113, 56 g of TFE, 26 g of ethylene and 32 g of vinyl acetate were charged, and the temperature was raised to 67° C. Then, 12 ml of a perfluorocyclohexane solution containing 3 wt % of t-butylperoxy isobutyrate, was injected to initiate a polymerization reaction.

The reaction was continued until the pressure became from 21.8 kg/cm$^2$G to 20.9 kg/cm$^2$G by the reaction. Then, the reactor was cooled, and the monomers in the reactor were purged. The dispersion containing the formed copolymer was subjected to filtration, washing and drying to obtain 11.2 g of white colored copolymer J. In the copolymer J, the ratio of the polymerized units based on TFE/the polymerized units based on ethylene was 49.1/50.9 (molar ratio), and the content of the polymerized units based on vinyl acetate in copolymer J was 23.3 mol %, by the NMR measurements. The melting point by the DSC measurement was not observed. The volumetric flow rate at 230° C. was at least 2000 mm$^3$/sec and was substantially larger than the measurable limit.

Copolymer J was formed at 200° C. into a film having a thickness of 60 µm. The tensile modulus of elasticity of this film was 40.3 kg/mm$^2$, but the tensile strength was as low as 1.42 kg/mm$^2$, and the mechanical properties are poor.

Industrial Applicability

The present invention provides a novel ETFE copolymer of a tetrafluoroethylene/ethylene/alkyl vinyl ester type. The film made of the ETFE copolymer of the present invention has a small tensile modulus of elasticity, high flexibility, durability, light transmittance, high strength and non-tackiness, and thus is useful as a covering material for an agricultural or horticultural installation, a release film and an interlayer for laminated glass, having excellent properties.

The entire disclosure of Japanese Patent Application No. 1999-259547 filed on Sep. 13, 1999 including specification, claims and summary are incorporated herein by reference in its entirety.

What is claimed is:

1. A tetrafluoroethylene/ethylene copolymer characterized in that the ratio of the polymerized units based on tetrafluoroethylene/the polymerized units based on ethylene, is from 35/65 to 65/35 (molar ratio), and it contains from 1 to 10 mol % of copolymerized units based on an alkyl vinyl ester (provided that the carbon number of the alkyl group is from 5 to 17, and when the alkyl group contains a branched structure, the carbon number is from 9 to 17), is crystalline and has a volumetric flow rate of from 1 to 1000 mm$^3$/sec.

2. The tetrafluoroethylene/ethylene copolymer according to claim 1, wherein the alkyl vinyl ester is at least one selected from the group consisting of vinyl caproate, vinyl caprylate and vinyl caprate.

3. A film of a tetrafluoroethylene/ethylene copolymer, which is made of the tetrafluoroethylene/ethylene copolymer as defined in claim 1 and has a tensile modulus of elasticity of from 1 to 70 kg/mm$^2$.

4. An agricultural covering material made of the film of a tetrafluoroethylene/ethylene copolymer as defined in claim 3.

5. A release film made of the film of a tetrafluoroethylene/ethylene copolymer as defined in claim 3.

6. An interlayer for laminated glass made of the film of a tetrafluoroethylene/ethylene copolymer as defined in claim 3.

7. The tetrafluoroethylene/ethylene copolymer according to claim 1, wherein the ratio of the polymerized units based on tetrafluoroethylene/the polymerized units based on ethylene is from 40/60 to 60/40 (molar ratio).

8. A film of tetrafluoroethylene/ethylene copolymer as defined in claim 3, having a thickness of from 10 to 300 μm.

9. A film of a tetrafluoroethylene/ethylene copolymer as defined in claim 3, having a thickness of from 20 to 100 μm.

10. A film of tetrafluoroethylene/ethylene copolymer as defined in claim 3, having a tensile modulus of from 1 to 60 kg/mm$^2$.

11. An agricultural covering material as defined in claim 4, having at least one side of the film treated with an anti-stick agent.

* * * * *